United States Patent [19]
Ando

[11] Patent Number: 5,848,239
[45] Date of Patent: Dec. 8, 1998

[54] VARIABLE-SPEED COMMUNICATION AND REPRODUCTION SYSTEM

[75] Inventor: Ichiro Ando, Yokosuka, Japan

[73] Assignee: Victory Company of Japan, Ltd., Yokohama, Japan

[21] Appl. No.: 723,145

[22] Filed: Sep. 30, 1996

[51] Int. Cl.$^6$ .................................................. G11B 17/00
[52] U.S. Cl. ............................ 395/200.33; 395/200.47; 348/12; 348/13; 345/327
[58] Field of Search ................ 364/400.01; 395/200.33, 395/200.47, 200.49, 200.57; 348/12, 13; 345/327, 329

[56] References Cited

U.S. PATENT DOCUMENTS 5,262,964  11/1993  Bonsall et al. ...................... 395/200.76
5,664,044   9/1997  Ware ........................................ 386/75

FOREIGN PATENT DOCUMENTS

5-166306  7/1993  Japan .

Primary Examiner—Thomas Peeso
Attorney, Agent, or Firm—Lowe Hauptman Gopstein Gilman & Berner

[57] ABSTRACT

A variable-speed communication and reproduction system consists of a server and a client device, and comprises a variable-speed data supplier for supplying a requested data set at a play speed specified by the user. The variable-speed data supplier includes the server. A control data communication system and a time-series data communication system are also included in the data supplier, which connect the server and the client. The communication and reproduction system further comprises a variable-speed reproducer for reproducing the data set supplied from the variable-speed data supplier at the specified play speed by adjusting the pitch of audio and the video frequencies, and a play speed setter responsive to the specified play speed for setting the specified play speed to the variable-speed data supplier and the variable-speed reproducer.

16 Claims, 7 Drawing Sheets

VARIABLE-SPEED COMMUNICATION AND REPRODUCTION SYSTEM

BACKGROUND OF THE INVENTION

1. Field of the Invention

The present invention relates to a communication and reproduction system capable of changing the speed of reproducing time-series information such as moving pictures, audios, etc.

2. Description of the Prior Art

There are a kind of client server systems in which a server, which stores moving picture and audio information, transmits a requested piece of information to a client device in response to a request from the client device, and the client device reproduces the transmitted information.

One example of such systems is a communication karaoke (vocal-eliminated song music) system, in which the moving picture and audio information comprises numbers of coded data. If a user can sing a song to his or her requested music played at a desired speed, it is preferable. However, conventional system can not change a predetermined play speed, that is, a predetermined decoding speed.

If the operation speed of the whole system is changed in accordance with a play speed, the following problems will occur in reproduced moving pictures and audios. That is, the pitch of the output audio will be changed as compared with that of the coding time in proportion to the play speed, becoming uncomfortable. Further, the pixel sampling frequency, the scanning line frequency and the frame frequency of the output moving picture signal will be changed in proportion to the play speed. On the other hand, those frequencies of a monitor which receives and displays the output moving picture signal are generally set for fixed values with certain tolerances. Thus, if the play speed is so set as to exceed any of the tolerances, the reproduction of the moving pictures and audios will be unsuccessful.

SUMMARY OF THE INVENTION

In accordance with one aspect of the invention, these and other problems of the prior art are overcome and an advance is made by a variable-speed communication and reproduction system comprising a variable-speed data supplier for supplying a requested data set at a play speed specified by the user, a variable-speed reproducer for reproducing the data set supplied from the variable-speed data supplier at the specified play speed by adjusting the pitch of audio and the video frequencies, and a play speed setter responsive to the specified play speed for setting the specified play speed to the variable-speed data supplier and the variable-speed reproducer.

The variable-speed reproducer comprises a reproducer for reproducing pictures and audio by decoding the supplied data set, an audio pitch corrector for correcting the pitch of the reproduced audio, and a video frequency matching circuit for matching the frequencies of the reproduced pictures to the predetermined frequencies.

In some embodiments, the variable-speed data supplier is a type comprising a time-series data storage and a read controller, in which the read controller causes the time-series storage to output a data set at the specified play speed to the variable-speed reproducer.

Alternatively, the variable-speed data supplier may further comprise a buffer circuit. In this case, based on the residual data quantity, the read controller causes the time-series storage to output a data set intermittently at a full speed of relevant circuit or a speed much higher than the specified speed to store the output data in the buffer circuit and supplies the stored data at the specified data to the variable-speed reproducer.

In one embodiment, a variable-speed communication and reproduction system comprises a server and a plurality of client devices. The server comprises a time-series storage and a time-series data distributer. Each of the client devices comprises a control data supplier and a variable-speed reproducer.

The variable-speed reproducer may be included either in each client device or in a server.

BRIEF DESCRIPTION OF THE DRAWINGS

Further objects and advantages of the present invention will be apparent from the following description of the preferred embodiments of the invention as illustrated in the accompanying drawings. In the drawings.

DETAILED DESCRIPTION OF THE PREFERRED EMBODIMENTS

In the following illustrative embodiments, it is assumed that a time-series information set comprises moving picture information and audio information accompanying the moving picture information constituting one of the numbers the variable-speed communication and reproduction system can provide.

Figure 1:
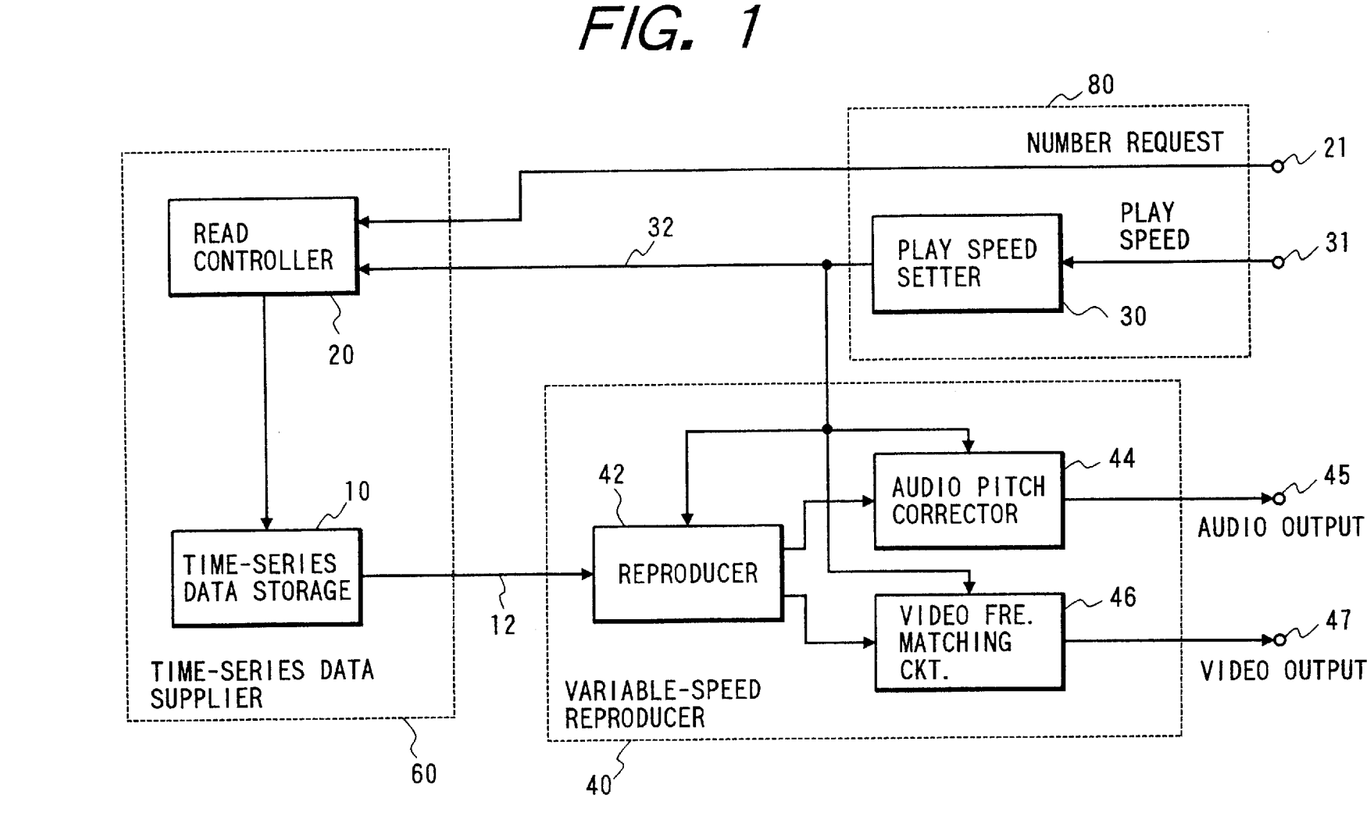
FIG. 1 is a diagram showing an illustrative variable-speed reproduction system for describing a basic concept of the invention.

A basic concept of the invention will be described referring to FIG. 1 in the following. In FIG. 1, an illustrative variable-speed reproduction system comprises a time-series data supplier 60 responsive to a number request from a line 21 and user specified play speed data from a line 31 for supplying a time-series data set specified by the number request at the user specified play speed, a variable-speed reproducer 40 for reproducing the time-series data set supplied from the time-series data supplier 60 to provide a pitch-corrected audio output and a frequency-matched video output at the user specified play speed (hereinafter, simply referred to as "variable-speed reproducing the time-series data set"), and a play speed setter for receiving user specified play speed data from the line 31 and setting the play speed data to the variable-speed reproducer 40 and the time-series data supplier 60.

The time-series data supplier 60 comprises a time-series data storage 10 for storing time-series data sets for the numbers the variable-speed reproduction system can provide and a read controller 20 responsive to the number request and the user specified play speed for causing the time-series data storage 10 to output the time-series data set specified by the number request at the user specified play speed. The variable-speed reproducer 40 comprises a reproducer 42 for reproducing the time-series data set into a reproduced audio data and a reproduced video data, a audio pitch corrector 44 for correcting the audio pitch of the reproduced audio data to provide the pitch-corrected audio data, and a video frequency (FRE.) matching circuit (CKT.) 46 for matching the video frequencies of the reproduced video data to the predetermined frequencies to provide the frequency-matched video output. Since the user specified play speed is set to all of the reproducer 42, the audio-pitch corrector 44 and the video frequency matching circuit 46, they each operate at the user specified play speed.

In operation, if the user makes a request for a desired number and sets a desired play speed by means of predetermined operations of a controller (not shown) attached to the variable-speed reproduction system, then the number request is input to the read controller 20 and the play speed setter 30 sets the user specified play speed to the read controller 20, the reproducer 42, the audio pitch corrector 44 and the video frequency matching circuit 46. As described above, in response to the number request and the play speed input, the time-series data supplier 60 supplies the reproducer 42 with a time-series data set specified by the number request at a play speed corresponding to the play speed input or the user specified play speed. The reproducer 42 reproduces the time-series data set to output an audio signal and a video signal at the user specified play speed to the audio pitch corrector 44 and the video frequency matching circuit 46, respectively.

The audio pitch corrector 44 corrects, on the basis of the user specified play speed data, the pitch of the audio signal supplied from the reproducer 42 to that of the case when the time-series data set were reproduced at a normal speed to output a pitch-corrected audio signal to an audio output terminal 45. Specifically, if the user specified play speed is faster than the normal speed, the pitch of the audio signal is lowered by the extent which has been raised through the reproduction by the reproducer 42. Otherwise, the pitch of the audio signal is raised by the extent which has been lowered through the reproduction by the reproducer 42.

On the other hand, the video frequency matching circuit 46 matches, on the basis of the user specified play speed data, the video frequencies of the video signal supplied from the reproducer 42 to those in case of the normal speed to output a frequency-matched video signal to a video output terminal 47. Specifically, if the user specified play speed is faster than the normal speed, the video frequencies of the video signal are lowered by means of, for example, a frame reduction. Otherwise, the video frequencies of the video signal are raised by means of, for example, a frame interpolation.

Thus, the variable-speed reproduction system variable-speed reproduces a time-series data set stored in the time-series data storage 10 at a user specified speed.

Figure 2:
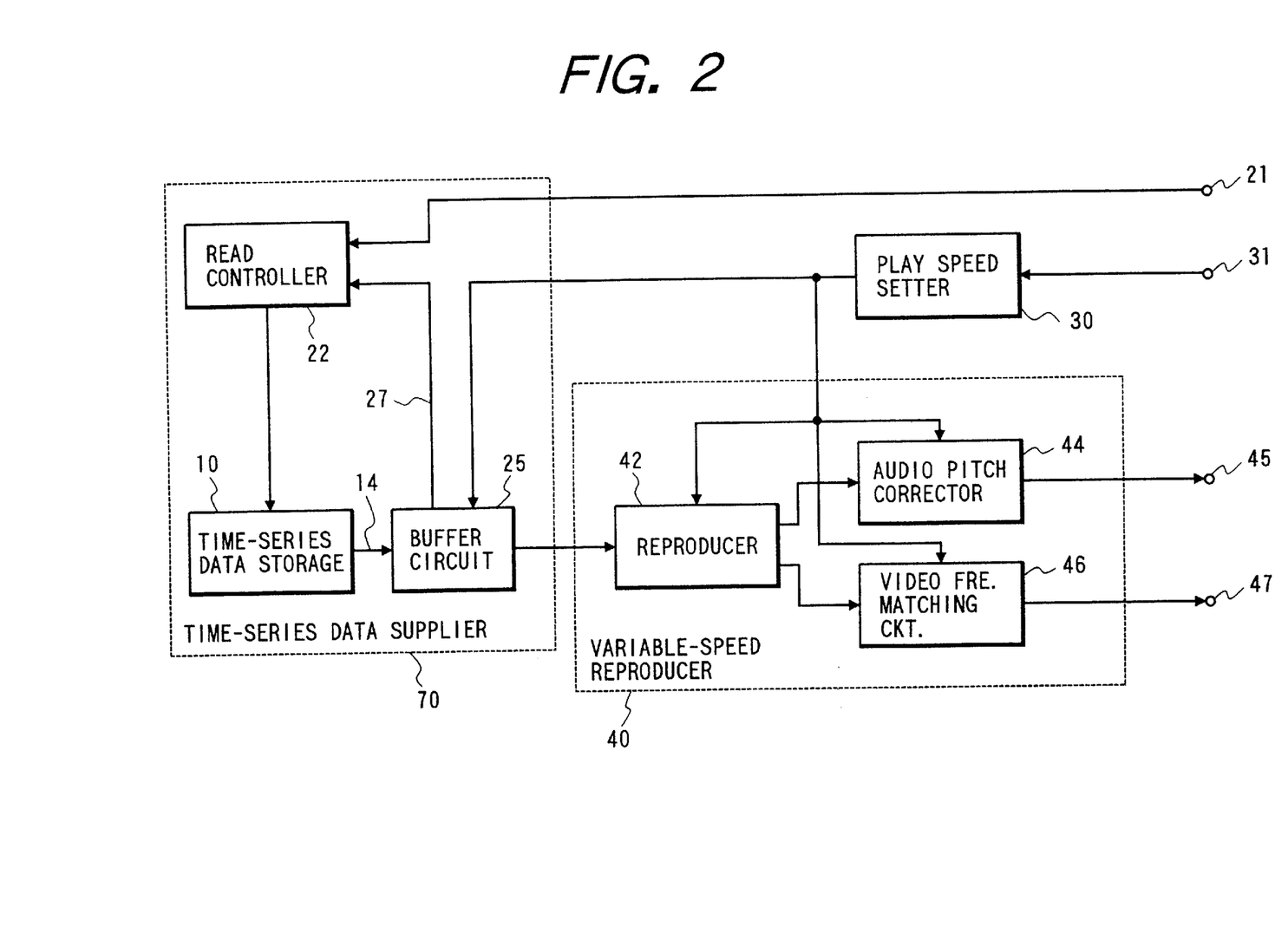
FIG. 2 is a diagram showing another illustrative variable-speed reproduction system for describing another basic concept of the invention.

Another basic concept of the invention will be described referring to FIG. 2 in the following. FIG. 2 is identical to FIG. 1 except the time-series data supplier 60 of FIG. 1 has been replaced by a time-series data supplier 70 in FIG. 2. For this, only the element 70 will be described. The time-series data supplier 70 comprises the time-series data storage 10, a read controller 22 having one input thereof connected to the number request line 21 for controlling the read operation of the time-series data storage 10, and a first-in first-out (FIFO) buffer circuit 25 for receiving the read time-series data from the time-series data storage 10 and temporarily storing more than a predetermined quantity of the time-series data to supply the variable-speed reproducer 40 with the stored time-series data at the user specified play speed and to output the residual data quantity to the read controller 22.

If the residual data quantity of the buffer circuit 25 is less than the predetermined quantity, the read controller 22 issues to the time-series data storage 10 an instruction to effect the output of the time-series data set specified by the number request, and otherwise issues an instruction to stop the output of the time-series data set. If the instruction to effect the output is issued, the time-series data storage 10 effects the output at a read-out speed corresponding to a play speed faster than the maximum play speed. Also, if the instruction to effect the output is issued again after the output of the time-series data set has been stopped, the output is resumed from the data following the data of the time-series data set which has been last output.

The buffer memory capacity necessary for the buffer circuit 25 is determined by the delay time from the output of the residual data quantity from the buffer circuit 25 to the start of the output control by the read controller 22, and the difference between the output rate of the time-series data storage 10 and the output rate of the buffer circuit 25 at the time of the minimum or maximum play speed. It is noted that in starting the reproduction, the buffer circuit 25 starts outputting the stored time-series data set after making sure that the data quantity in the buffer circuit 25 exceeds the predetermined quantity.

Figure 3:
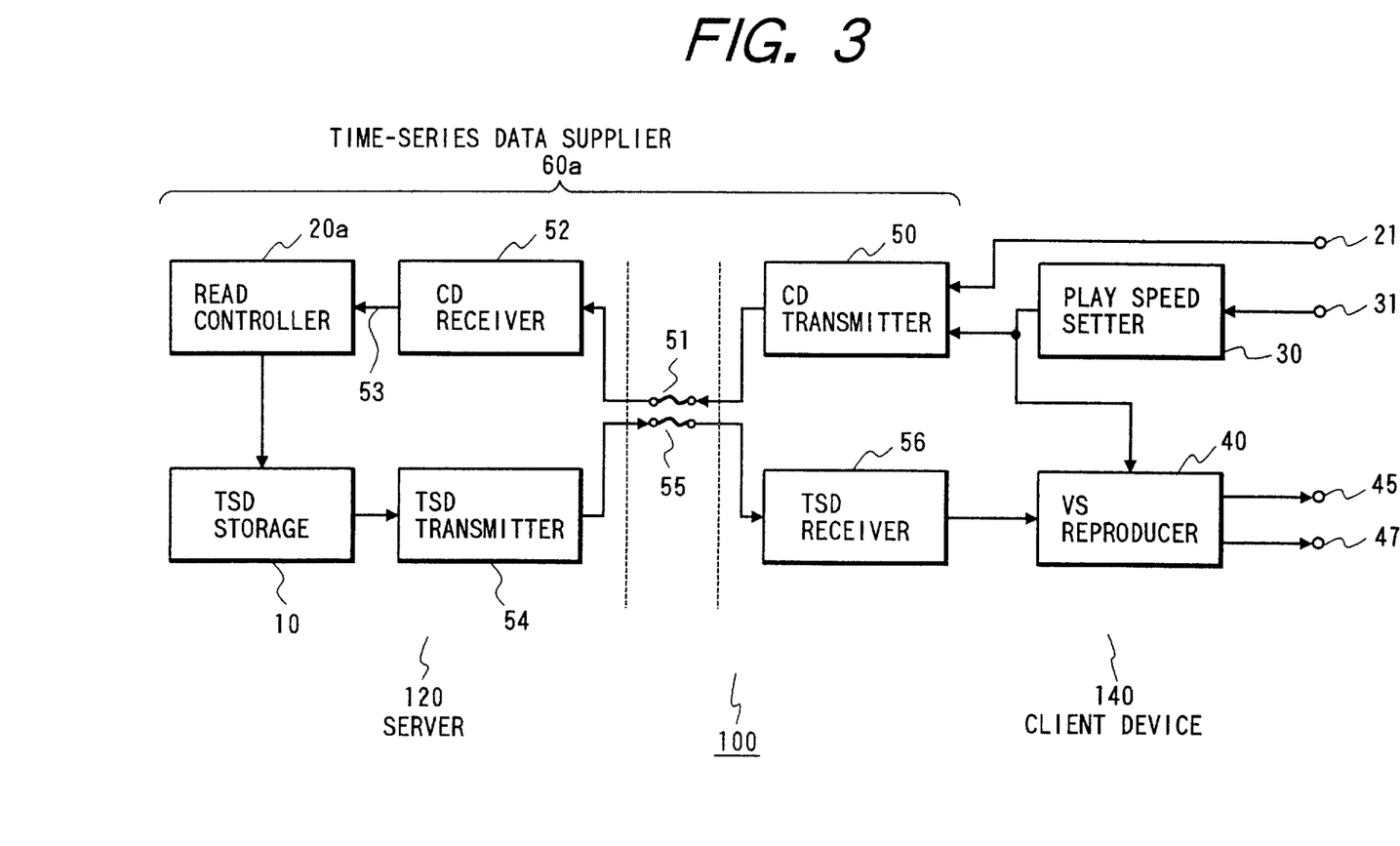
FIG. 3 is a block diagram showing an arrangement of a first illustrative embodiment of a variable-speed communication and reproduction system according to the first aspect of the invention.

FIG. 3 is a block diagram showing an arrangement of a first illustrative embodiment of a variable-speed communication and reproduction system according to the first aspect of the invention. In FIG. 3, the variable-speed communication and reproduction system 100 is considered from the geometrical point of view to comprise a server 120 and a client device 140. The system 100 can be also considered from the functional point of view to comprise a time-series data supplier 60a responsive to a number request from a line 21 and user specified play speed data from a line 31 for supplying a time-series data set specified by the number request at the user specified play speed, the variable-speed (VS) reproducer 40 (identical to that of FIG. 1) for variable-speed reproducing the time-series data set, and the play speed setter 30 (identical to that of FIG. 1) for receiving the user specified play speed data from the line 31 and setting the play speed data to the variable-speed reproducer 40 and the time-series data supplier 60.

In the time-series data supplier 60a, the read controller 20 of FIG. 1 has been replaced by a read controller 20a and a control data communication system (transmitter and receiver) 50 and 52 between which a transmission line 51 intervenes. Also, the line 12 of FIG. 1 has been replaced by a time-series data (TSD) communication system (transmitter and receiver) 54 and 56 between which a transmission line 55 intervenes.

Accordingly, the read controller 20a only differs from the read controller 20 of FIG. 1 in that the controller 20a receives the number request and the play speed data via a single input line 53 instead of two respective input lines 21 and 32.

In operation, if the user makes a request for a desired number and sets a desired play speed by means of predetermined operations of a controller (not shown) attached to the variable-speed reproduction system, then the number request is input to one input of the control data (CD) transmitter 50 and the play speed setter 30 sets the user specified play speed to the CD transmitter 50 and the VS (variable-speed) reproducer 40.

As described in conjunction with the system of FIG. 1, in response to the number request and the play speed input (or control data), the time-series data supplier 60a supplies the variable-speed (VS) reproducer 40 with a time-series data set specified by the number request at a play speed corresponding to the play speed input or the user specified play speed. The VS reproducer 40 variable-speed reproduces the time-series data set to output a pitch-corrected audio signal and a frequency-matched video signal to the line 45 and 47, respectively.

Figure 4:
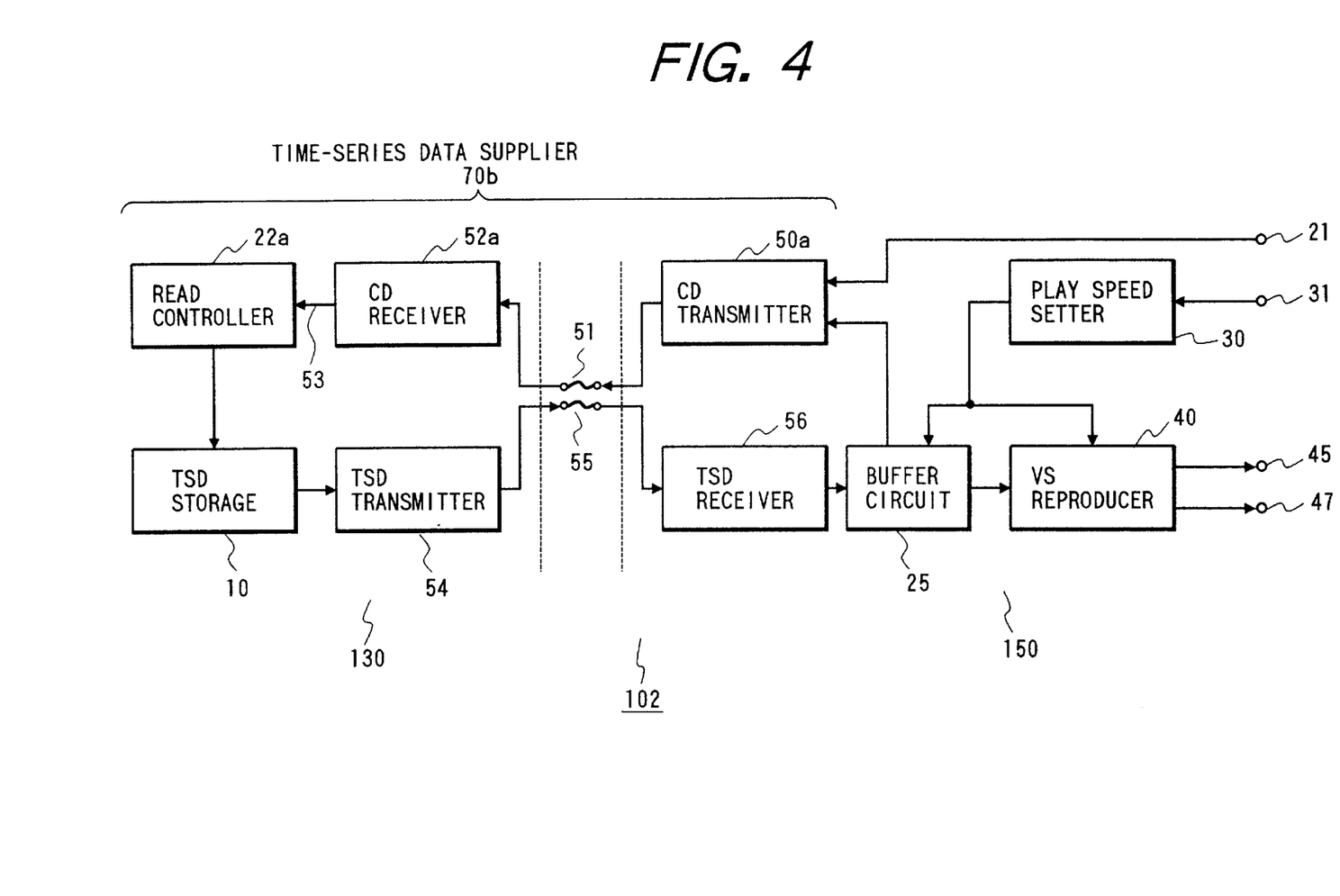
FIG. 4 is a block diagram showing an arrangement of a second illustrative embodiment of a variable-speed communication and reproduction system according to the second aspect of the invention.

FIG. 4 is a block diagram showing an arrangement of a second illustrative embodiment of a variable-speed communication and reproduction system 102 according to the second aspect of the invention. In FIG. 4, the variable-speed communication and reproduction system 102 is considered from the geometrical point of view to comprise a server 130 and a client device 150. The system 100 can be also considered from the functional point of view to comprises a time-series data supplier 70a responsive to the number request from the line 21 and the user specified play speed data from the line 31 for supplying a time-series data set specified by the number request at the user specified play speed, the variable-speed (VS) reproducer 40 (identical to that of FIGS. 1 and 2) for variable-speed reproducing the time-series data set, and the play speed setter 30 (identical to that of FIGS. 1 and 2) for receiving the user specified play speed data from the line 31 and setting the play speed data to the variable-speed reproducer 40 and the time-series data supplier 60.

In the time-series data supplier 70a, the read controller 22 of FIG. 2 has been replaced by a read controller 22a and a control data (CD) communication system (transmitter and receiver) 50a and 52a between which a transmission line 51 intervenes. Also, the transmission line 14 of FIG. 2 has been replaced by a time-series data (TSD) communication system (transmitter and receiver) 54 and 56 between which a transmission line 55 intervenes.

Accordingly, the read controller 22a only differs from the read controller 22 of FIG. 2 in that the controller 22a receives the number request and the play speed data via a single input line 53 instead of two respective input lines 21 and 27.

In operation, if the user makes a request for a desired number and sets a desired play speed by means of predetermined operations of a controller (not shown) attached to the variable-speed communication and reproduction system, then the number request is input to one input of the control data (CD) transmitter 50a and the play speed setter 30 sets the user specified play speed to the CD transmitter 50a and the VS (variable-speed) reproducer 40.

As described in conjunction with the system of FIG. 2, in response to the number request and the play speed input (or control data), the time-series data supplier 70a supplies the variable-speed (VS) reproducer 40 with a time-series data set specified by the number request at a play speed corresponding to the play speed input or the user specified play speed. The VS reproducer 40 variable-speed reproduces the time-series data set to output a pitch-corrected audio signal and a frequency-matched video signal to the line 45 and 47, respectively.

In the time-series data supplier 70a, the read controller 22a receives the control data via a CD transmitter 50a, transmission line 51, and a CD receiver 52a, and the TSD storage output is input to the buffer circuit 25 via a TSD transmitter 54, the transmission line 55, and the TSD receiver 56. Except for these points, the operation of the time-series data supplier 70a is identical to that of the time-series data supplier 70 of FIG. 2.

Accordingly, the buffer memory capacity necessary for the buffer circuit 25 of FIG. 4 is determined by the total control delay time which it takes since the residual data quantity data is output from the buffer circuit 25 to the read controller 22a via the CD communication system 50a and 52a until the control by the read controller 22a starts, and the difference between the output rate of the time-series data storage 10 and the output rate of the buffer circuit 25 at the time of the minimum or maximum play speed. It is again noted that in starting the reproduction, the buffer circuit 25 starts outputting the stored time-series data set after making sure that the data quantity in the buffer circuit 25 exceeds the predetermined quantity.

Figure 5:
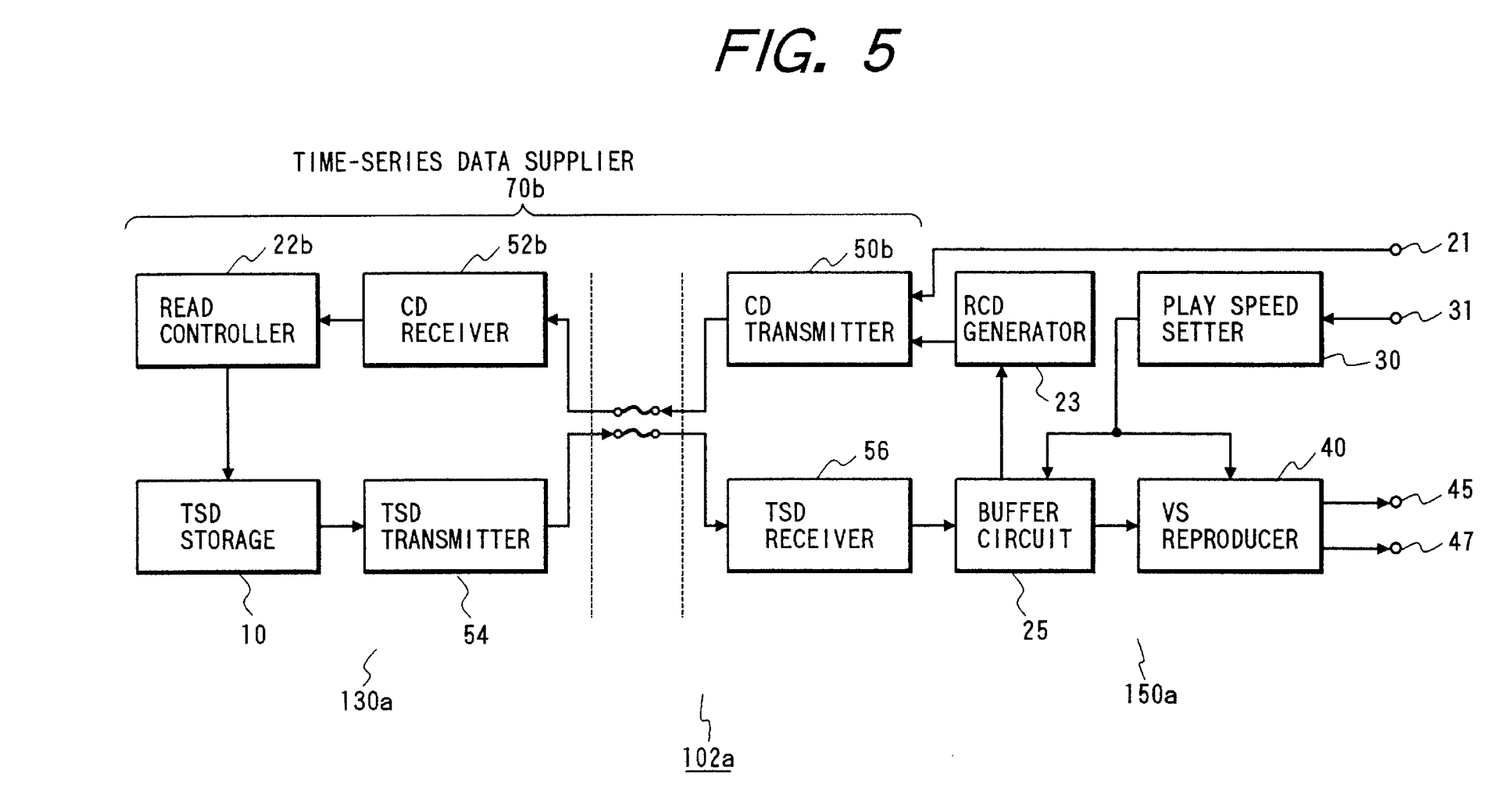
FIG. 5 is a block diagram showing an arrangement of a modification of the second embodiment of FIG. 4.

FIG. 5 is a block diagram showing an arrangement of a modification of the second embodiment of FIG. 4. FIG. 5 is identical to FIG. 4 except that a read control data (RCD) generator 23 has been inserted between the buffer circuit 25 and the control data (CD) transmitter 50b. Then, only the operation of the time-series data supplier 70b will be described.

In FIG. 5, if the read control data (RCD) generator 23 determines based on the residual data quantity data from the buffer circuit 25 that the residual data quantity of the buffer circuit 25 is less than the predetermined quantity, the generator 23 issues to the CD transmitter 50b an instruction to perform the output of the time-series data set specified by the number request. Otherwise, the RCD generator 23 issues an instruction to stop the output of the time-series data set. If the instruction to perform the output is issued, the read controller 22b controls the time-series data storage 10 to effect the output at a read-out speed corresponding to a play speed faster than the maximum play speed. Also, if the instruction to effect the output is issued again after the output of the time-series data set has been stopped, the output is resumed from the data following the data of the time-series data set which has been last output.

The other description given in conjunction with FIG. 2 is also valid in this embodiment.

Figure 6:
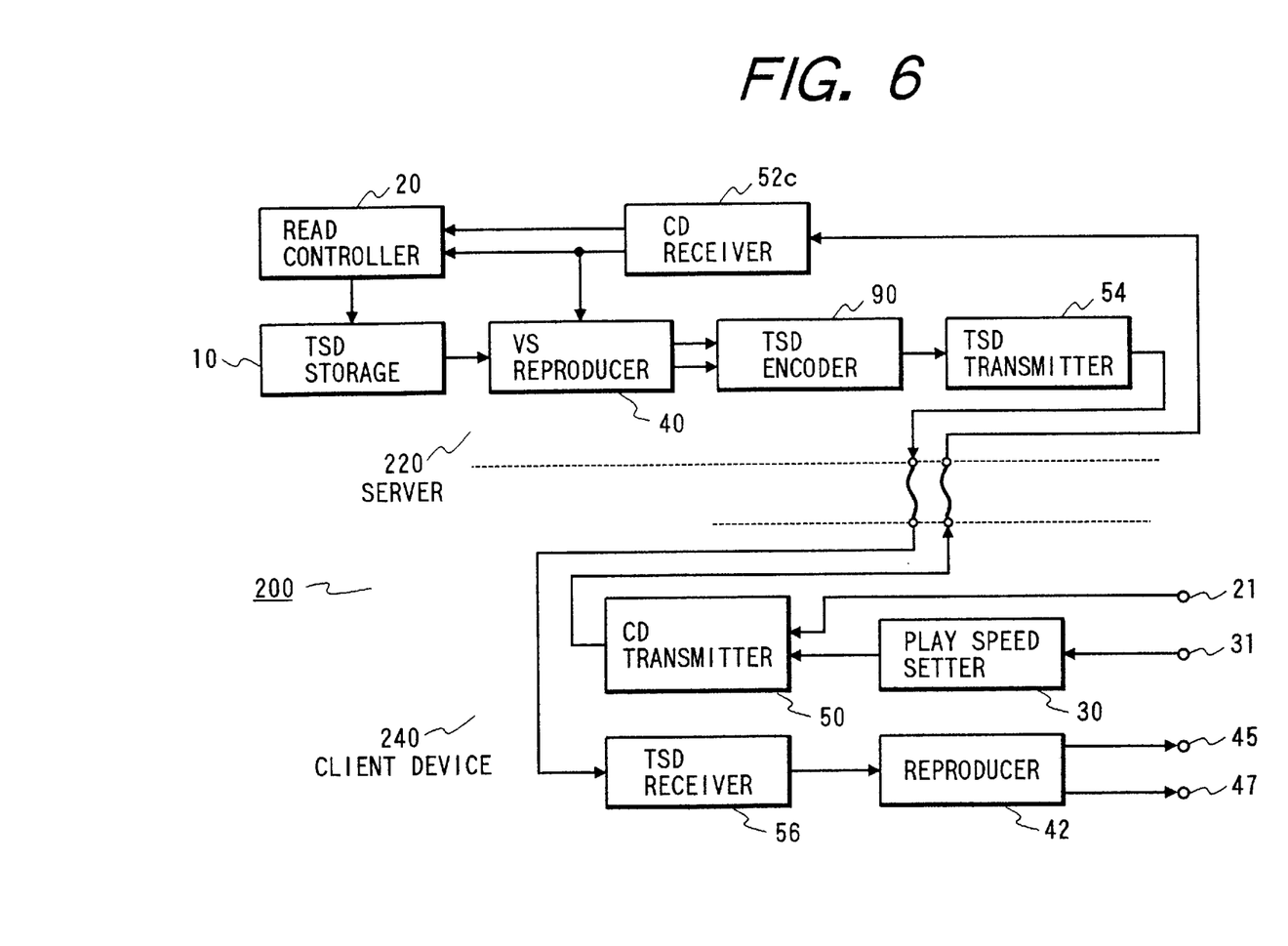
FIG. 6 is a block diagram showing an arrangement of a third illustrative embodiment of a variable-speed communication and reproduction system according to the first aspect of the invention.

FIG. 6 is a block diagram showing an arrangement of a third illustrative embodiment of a variable-speed communication and reproduction system according to the first aspect of the invention. The variable-speed communication and reproduction system 200 is of a type in which a variable-speed reproduction is done in the server 220. In FIG. 6, a control data supplier 80 of FIG. 1 has been replaced by a CD supplier 80 equivalent portion, i.e., the lines 21 and 31 and play speed setter 30, the CD transmitter 50, and a CD receiver 52c. The system 200 comprises the time-series data storage 10, the read controller 20, the variable-speed reproducer 40, and the CD supplier 80 equivalent portion, which constitute the system shown in FIG. 1. The server 220 further comprises a TSD encoder 90 having two input terminals thereof connected to the audio output and the video output of the variable-speed reproducer 40, and a TSD transmitter 54 having an input connected to the TSD encoder 90 output. A client device 240 of the system 200 comprises a TSD receiver 56 having its input connected to the TSD transmitter 54 output, and a reproducer 42 having its input connected to the TSD receiver 56 output for providing a final audio signal and a final video signal.

In operation, if the user makes a request for a desired number and sets a desired play speed by means of predetermined operations of a controller (not shown) attached to the variable-speed reproduction system, then the number request and the play speed (that is, control data) are input to the CD transmitter 50 directly or via the play speed setter 30, respectively. The CD transmitter 50 transmits the control data to the CD receiver 52c, which supplies the number request only to the read controller 20 and also supplies the play speed data to both the read controller 20 and the variable-speed reproducer 40. In response to the control data, the read controller 20 controls the time-series data storage 10 to output the requested time-series data set at the user specified play speed to the variable-speed reproducer 40, which variable-speed reproduces the requested time-series data set to output a pitch-corrected audio signal and a frequency-matched video signal to the encoder 90. The encoder 90 encodes the signals to feed the TSD transmitter 54, which transmits the encoded signal to the TSD receiver 56. The TSD receiver 56 supplies the encoded signal to the reproducer 42, which finally decodes the encoded signal.

The other description provided in conjunction with FIG. 1 is also true to this embodiment. For details of operation of the variable-speed reproducer 40, see the description concerning FIG. 1.

Figure 7:
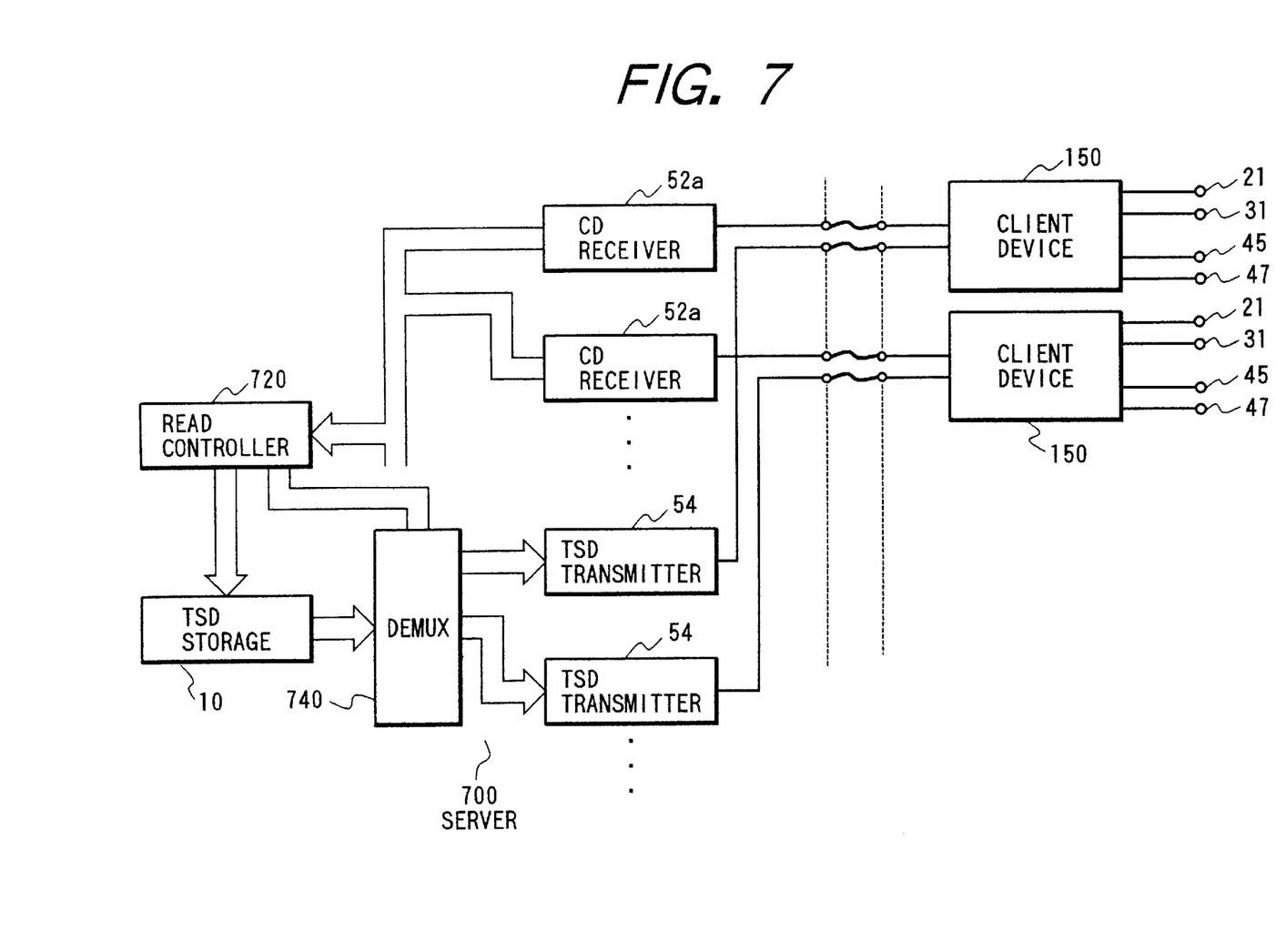
FIG. 7 is a block diagram showing an arrangement of a fourth illustrative embodiment of a variable-speed communication and reproduction system according to the invention.

FIG. 7 is a block diagram showing an arrangement of a fourth illustrative embodiment of a variable-speed communication and reproduction system according to a further aspect of the invention. This embodiment is a multi-client version of the second illustrative embodiment of FIG. 4. In FIG. 7, the variable-speed communication and reproduction system comprises a server 700 and a plurality of client devices 150, which are identical to the client device 150 of FIG. 4. The server 700 comprises the above described TSD storage 10, CD receivers 52a each connected to a different one of the client devices 150 for supplying control data, a read controller 720 responsive to the control data for causing the TSD storage to output TSD sets specified by number requests in a time-division multiplexed manner, and a demultiplexer (DEMUX) 740 based on the control of the read controller 720 for distributing the output TSD sets to corresponding TSD transmitters 54.

In the description in conjunction of FIGS. 3 through 7, the time-series data set is assumed to comprise moving pictures and audio. However, the time-series data set may be a combination of a plurality of moving picture sets and a plurality of audios accompanying the moving picture sets, or may comprise only moving pictures, audios, and/or accompanying caption data.

A client device 140, 150, 150a or 240 may variable-speed reproduce either all or a part of the time-series data transmitted from the server 120, 130, 130a or 220, respectively, depending on a user's option. For example, the server may transmit a set of time-series information for moving pictures, an accompanying audio and a plurality of captions for different foreign languages to permit the user to select one of the captions for a desired language at the time of play.

Many widely different embodiments of the present invention may be constructed without departing from the spirit and scope of the present invention. It should be understood that the present invention is not limited to the specific embodiments described in the specification, except as defined in the appended claims.

What is claimed is:

1. A variable-speed communication and reproduction system separated into a server and a client device remote from the server, the client device reproducing, at a play speed specified by a user, a time-series data set stored in the server and requested by a number request from the user, the system comprising:

1) means responsive to the number request and the play speed specified by the user for supplying said requested time-series data set at said play speed, said means comprising:
      said server;
      first means for communicating said number request and information on said play speed from said client device to said, server; and
      second means for communicating said time-series data set from said server to said client device;
   2) means for receiving said time-series data set from said supplying means and reproducing at least a pitch-corrected audio signal and a frequency-matched video signal at said play speed; and
   3) means for passing said number request to said first means and said information on said play speed to at least said receiving and reproducing means,
   wherein said means or supplying said requested time-series data set further comprises:
      means for storing a plurality of time-series data sets, said storing means being disposed in said server and coupled to said second means;
      buffer means for receiving said information on said play speed, temporarily storing data supplied from said second means and reporting a residual quantity of said data to said first means and for supplying said data to said receiving and reproducing means at said play speed; and
      means responsive to said number request and said residual quantity of said data and based on a determination that said buffer needs a data supply for controlling said storing means to output at a full speed said requested time-series data set to said second means, and wherein:
         said passing means also passes said information on said play speed to said buffer means.

2. A system as defined in claim 1, wherein each of said plurality of time-series data sets comprises a series of moving pictures and accompanying audio data.

3. A system as defined in claim 2, wherein said accompanying audio data is karaoke (vocal-eliminated) song music.

4. A system as defined in claim 2, wherein each of said plurality of time-series data sets further comprises a plurality of caption data.

5. A variable-speed communication and reproduction system separated into a server and a client device remote from the server, the client device reproducing, at a play speed specified by a user, a time-series data set stored in the server and requested by a number request from the user the system comprising:

1) means responsive to the number request and the play speed specified by the user for supplying said requested time-series data set at said play speed, said means comprising:
      said server;
      first means for communicating said number request and information on said play speed from said client device to said server; and second means for communicating said time-series data set from said server to said client device;

2) means for receiving said time-series data set from said supplying means and reproducing at least a pitch-corrected audio signal and a frequency-matched video signal at said play speed; and 3) means for passing said number request to said first means and said information on said play speed to at least said receiving and reproducing means, wherein said means for supplying said requested time-series data set further comprises:

means for storing a plurality of time-series data sets, said storing means being disposed in said server and coupled to said second means;

buffer means for receiving said information on said play speed, temporarily storing data supplied form said second means and outputting information on a residual quantity of said data to said first means and for supplying said data to said receiving and reproducing means at said play speed;

means for receiving said information on said residual quantity and supplying said first means with a decision on whether said buffer means needs a data supply; and means responsive to said number request and said decision for controlling said storing means to output at a full speed said requested time-series data set to said second means, and wherein:

said passing means also passes said information on said play speed to said buffer means.

6. A system as defined in claim 5, wherein each of said plurality of time-series data sets comprises a series of moving pictures and accompanying audio data.

7. A system as defined in claim 6, wherein said accompanying audio data is karaoke (vocal-eliminated) song music.

8. A system as defined in claim 6, wherein each of said plurality of time-series data sets further comprises a plurality of caption data.

9. A variable-speed communication and reproduction system separated into a server and a client device remote from the server, the client device reproducing, at a play speed specified by a user, a time-series data set stored in the server and requested by a number request, the system comprising:

means responsive to the number request and the play speed specified by the user for supplying said requested time-series data set at said play speed;

means for receiving said time-series data set from said supplying means and reproducing pitch-corrected audio signal and frequency-matched video signal at said play speed;

means for encoding said pitch-corrected audio signal and frequency-matched video signal, above said means being disposed in said server;

first means for communicating said number request and said play speed from said client device to said server;

second means for communicating said time-series data set from said server to said client device;

means disposed in said client device for passing said number request and said play speed to said first means; and means for receiving and decoding said time-series data set from said second means to provide at least a video signal and an audio signal.

10. A system as defined in claim 9, wherein each of said plurality of time-series data sets comprises a series of moving pictures and accompanying audio data.

11. A system as defined in claim 10, wherein said accompanying audio data is karaoke (vocal-eliminated) song music.

12. A system as defined in claim 10, wherein each of said plurality of time-series data sets further comprises a plurality of caption data.

13. A variable-speed communication and reproduction system comprising a server and a plurality of client devices remote from the server, each of the plurality of client devices reproducing, at a play speed specified by the user of the client device, a time-series data set stored in the server and requested by a number request from the user, each of said plurality of client devices comprising:

means for receiving and outputting said play speed;

buffer means for receiving said play speed, temporarily storing data of said requested time-series data set and supplying said data of said requested time-series data set at said play speed, and for outputting a residual quantity of said data of said requested time-series data set;

means for receiving said data of said requested time-series data set from said buffer means and reproducing at least a pitch-corrected audio signal and a frequency-matched video signal at said play speed;

first means for communicating said number request and said residual quantity of said data from said client device to said server; and second means for communicating said data of said requested time-series data set from said server to said buffer means in said client device, and said server comprising:

means for storing a plurality of time-series data sets;

means responsive to said number request and said residual quantity of said data transmitted from said each of said plurality of client devices through said first means and based on a determination that said buffer means needs a data supply for controlling said storing means to output said requested time-series data set for said each of said plurality of client devices at a full speed in a multiplexed form; and means, responsive to control data from said means for controlling said storing means, for demultiplexing said requested time-series data sets for said plurality of client devices and outputting each of said requested time-series data sets for said plurality of client devices to one of said second means associated with the client device which has sent said number request for the time-series data set.

14. A system as defined in claim 13, wherein each of said plurality of time-series data sets comprises a series of moving pictures and accompanying audio data.

15. A system as defined in claim 14, wherein said accompanying audio data is karaoke (vocal-eliminated) song music.

16. A system as defined in claim 14, wherein each of said plurality of time-series data sets further comprises a plurality of caption data.

* * * * *

UNITED STATES PATENT AND TRADEMARK OFFICE
CERTIFICATE OF CORRECTION

PATENT NO.    : 5,848,239
DATED         : December 8, 1998
INVENTOR(S)   : Ichiro Ando It is certified that error appears in the above-indentified patent and that said Letters Patent is hereby corrected as shown below:

Title page, item [73], Assignee:

change "Victory" to --Victor--

Signed and Sealed this

Twenty-first Day of September, 1999

Attest:

Attesting Officer

Q. TODD DICKINSON

Acting Commissioner of Patents and Trademarks